United States Patent Office 3,439,552
Patented Apr. 22, 1969

3,439,552
SELECTIVE DRIVE DEVICE
Peter Roderick King, Littleover, and Dennis Litchfield, Derby, England, assignors to Rolls-Royce Limited, Derby, England, a British company
Filed Mar. 6, 1967, Ser. No. 620,854
Claims priority, application Great Britain, Mar. 15, 1966, 11,392/66
Int. Cl. F16h 3/34
U.S. Cl. 74—353                                    15 Claims

ABSTRACT OF THE DISCLOSURE

A selective drive transmits drive from a common motor shaft to a selected secondary shaft through a transmission member mounted on a rotary selector. When it is desired to transmit drive to a different secondary shaft transfer means are operated to cause the selector to rotate until the newly selected secondary shaft is engaged with the transmission member.

---

This invention relates to selective drive devices, and is particularly, but not exclusively, applicable to the remote control of rotatably adjustable members in, for example, gas turbine engine fuel systems.

According to the present invention there is provided a selective drive device comprising a single primary shaft, several secondary shafts arranged in a circular array about the primary shaft, a drive transmission member in drive connection with the primary shaft, transfer means operable when desired for causing the said drive transmission member to be presented on rotation of the primary shaft to each of said secondary shafts in turn, and means for rendering the transfer means inoperative automatically when said transmission member is presented to a selected secondary shaft to establish a drive connection between the primary shaft and said secondary shaft through the drive transmission member.

Preferably the transfer means are controlled electrically by an electrical control circuit including a bridge network in which the resistance of one arm of the bridge has a unique value for each consecutive position of the drive transmission member, the bridge being balanced only when the connecting member is engaged with the selected secondary shaft, the transfer means being controlled by the out-of-balance current of the bridge so that the transfer means is inoperative only when the bridge network is balanced.

In a preferred embodiment there is provided a planet carrier on which a planet wheel constituting the said drive transmission member is rotatably mounted, said planet wheel being rotatable about a sun wheel to which said primary shaft is connected, and each secondary shaft being connected to a respective gear wheel with which the planet wheel may mesh when the planet carrier is in a respective selected position. Additionally, there may be provided a rotatably mounted annular member having radially inwardly facing teeth with which the said planet wheel meshes, said transfer means comprising a stop member which may be moved selectively into locking engagement with the planet carrier and with the annular member respectively to prevent rotation thereof and to render the selector means respectively inoperable and operable.

An electric motor may be drivingly connected to the primary shaft and switch means may be provided for connecting the motor for rotation in either direction selectively when the drive connection between the primary shaft and the selected secondary shaft is established. Separate switch means may be provided on a common control panel for each respective secondary shaft and a switch selector member is mounted on said panel for releasing for operation only the switch means of a selected secondary shaft and for locking the remaining switch means.

The invention also comprises a gas turbine engine fuel system including in combination a plurality of rotatably adjustable members and a selective drive device as set forth above, respective shafts of the said drive device being drivingly connected to respective adjustable members so that adjustment thereof may be effected selectively by rotation only of the primary shaft of the drive device.

The invention will be described, merely by way of example, with reference to the accompanying drawings, in which.

Figure 1:
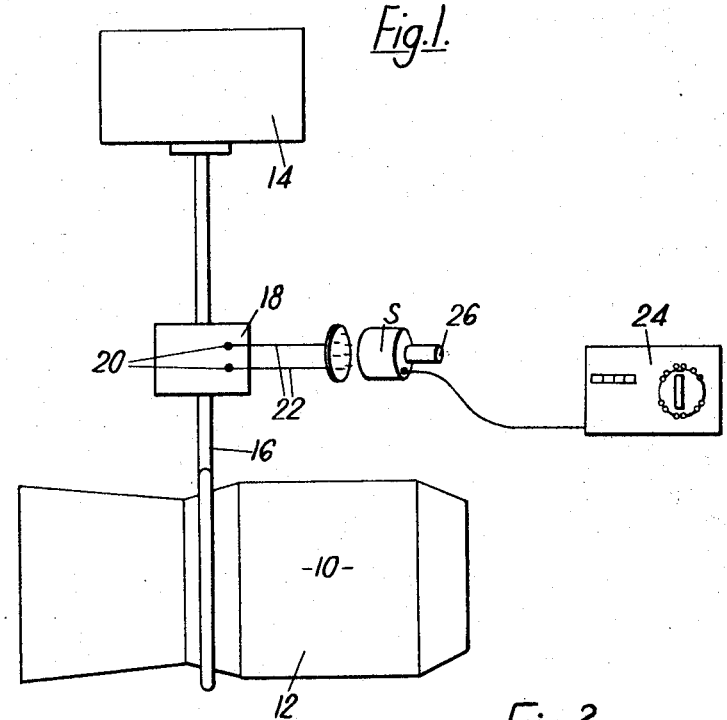
FIGURE 1 illustrates diagrammatically a preferred application of a selective drive device of the present invention to a gas turbine engine fuel system.

Referring to the drawings, FIGURE 1 shows a gas turbine jet propulsion engine 10 mounted on an aircraft (not shown). The engine 10 has combustion equipment 12 which is supplied with fuel from a fuel tank 14 in the aircraft through a fuel supply line 16.

A fuel control unit 18 is provided in the fuel supply line 16 for controlling the amount of fuel supplied to the combustion equipment 12 of the engine 10. The fuel control unit 18 may be of any known type, and includes one or more governor or metering devices (not shown), which have provision for manual adjustment or setting by means of respective rotatably adjustable members, two only of which are indicated diagrammatically at 20.

The fuel control unit 18 is normally mounted on or close to the engine 10, and adjustment of the members 20 is not, therefore, normally possible when the aircraft is in flight, the members 20 being relatively inaccessible. It is an object of the present invention to provide means whereby adjustment of each adjustable member 20 selectively may be effected from a remote position.

Each adjustable member 20 is connected via a respective flexible drive transmission 22 to a selective drive device S, which is constructed in accordance with the invention, as hereinafter described. The selective drive device S is controlled electrically, in a manner to be described, from a remote control panel 24, which may be disposed on the flight deck of the aircraft.

The drive device S has a single drive input shaft (not shown in FIGURE 1) driven by an electric motor 26, and said input shaft may be selectively connected, as hereinafter described, to any selected one of said flexible drive transmissions 22 under control of the remote control panel 24. In this way the single electric motor 26 and single drive input shaft may effect adjustment of all the adjustable members 20 in turn as required.

One form of selective drive device S will now be described with reference to FIGURES 4 and 5. The device S has a hollow cylindrical casing 30 having an axially extending shaft 32 journalled therein, the shaft 32 having a splined connection 34 with an input shaft, hereinafter referred to as the "primary" shaft 36, to which the motor 26 (shown in broken lines in FIGURE 4) is drivingly connected.

The shaft 32 carries a sun wheel 38 which meshes with a planet wheel 40. The planet wheel 40 is journalled in a rotatable planet carrier 42 which is mounted for rotation about the axis X of the shaft 32. An annular ring gear member 44 is rotatably mounted about the planet carrier 42 for rotation about the axis X. The ring gear member 44 is provided with radially inwardly facing gear teeth 46 which mesh with the gear teeth of the planet wheel 40. Additional planet wheels, such as that shown at 40′ in FIGURE 4 may be provided which mesh with the sun wheel 38 and the ring gear member 44 only.

The planet carrier 42 and ring gear member 44 are each provided externally with respective splines 48, 50 which are disposed at the same radius with respect to the common axis of rotation X but axially separated from each other. An axially movable stop member 52 is connected to the armature of a solenoid 54 (shown in broken lines) mounted on the drive device S. The stop device 52 has two respective positions, corresponding respectively to the de-energised and energised conditions of the solenoid 54, in which the stop member 52 engages respectively the splines 48, 50 to prevent rotation of the planet carrier 42 and ring gear member 44 respectively.

Figure 4:
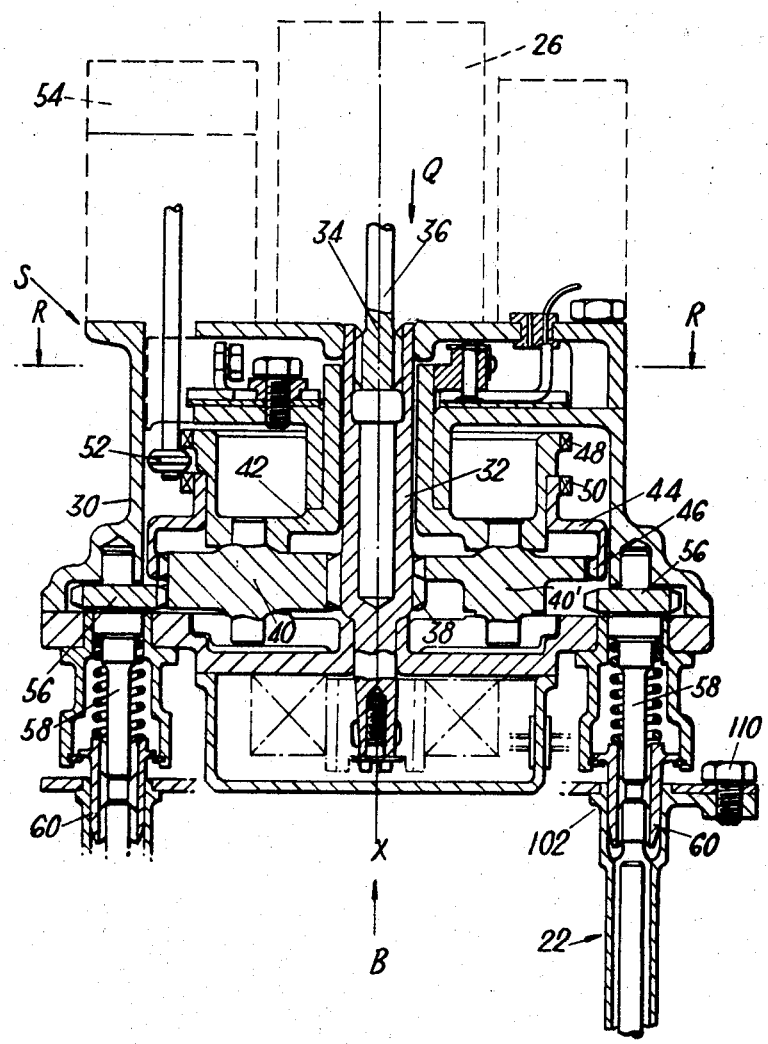
FIGURE 4 is a diagrammatic sectional view of a selective drive device according to one embodiment of the invention.

A number of output gear wheels 56 (two only of which are shown in FIGURE 4) are rotatably mounted in the casing 30 so that any selected one of said gear wheels 56 may mesh, when the planet carrier 42 is in the appropriate position, with the planet wheel 40. Each of the gear wheels 56 is mounted on a respective secondary shaft 58 which is in turn connected to a respective internally splined sleeve 60.

The drive device S as hereinbefore described has two different modes of operation: in the first mode, the solenoid 54 is energised, and the ring gear member 44 held against rotation by engagement of the splines 50 with the stop member 52. Rotation of the primary shaft 36 will therefore cause rotation of the planet carrier 42, accompanied by precession of the planet wheel 40 about the sun wheel 38. In this "selection" mode of operation the planet carrier 42 acts as a drive selector means, and presents the planet wheel 40 to each of the output gear wheels 56 in turn.

In the second mode of operation of the drive device S the solenoid 54 is de-energised and the stop member 52 engaged with the splines 48 of the planet carrier 42. In this "transmission" mode of operation the planet carrier 42 is held against rotation and, if the planet wheel 40 is meshed with a selected output gear wheel 56, rotation of the primary shaft 36 will cause rotation of the respective secondary shaft 58 on which the respective gear wheel 56 is mounted, a drive connection being effected through the planet wheel 40.

Evidently the solenoid 54 and movable stop member 52 act as transfer means for effecting a changeover of the device S from the "selection" to the "transmission" mode of operation.

An electrical control circuit is provided for effecting automatically the changeover of the device S from the "selection" mode to the "transmission" mode. A suitable control circuit is shown diagrammatically in FIGURE 6 for a device having three secondary shafts 58, respective parts relating to which will be given additional references a, b, c respectively.

In order that the changeover may be effected when and only when the planet wheel 40 is in mesh with the secondary gear wheel 56 of a selected secondary shaft 58, it is necessary to include in the control circuit a selective switching device which is controlled by the selector means, in this case the planet carrier 42.

Figure 5:
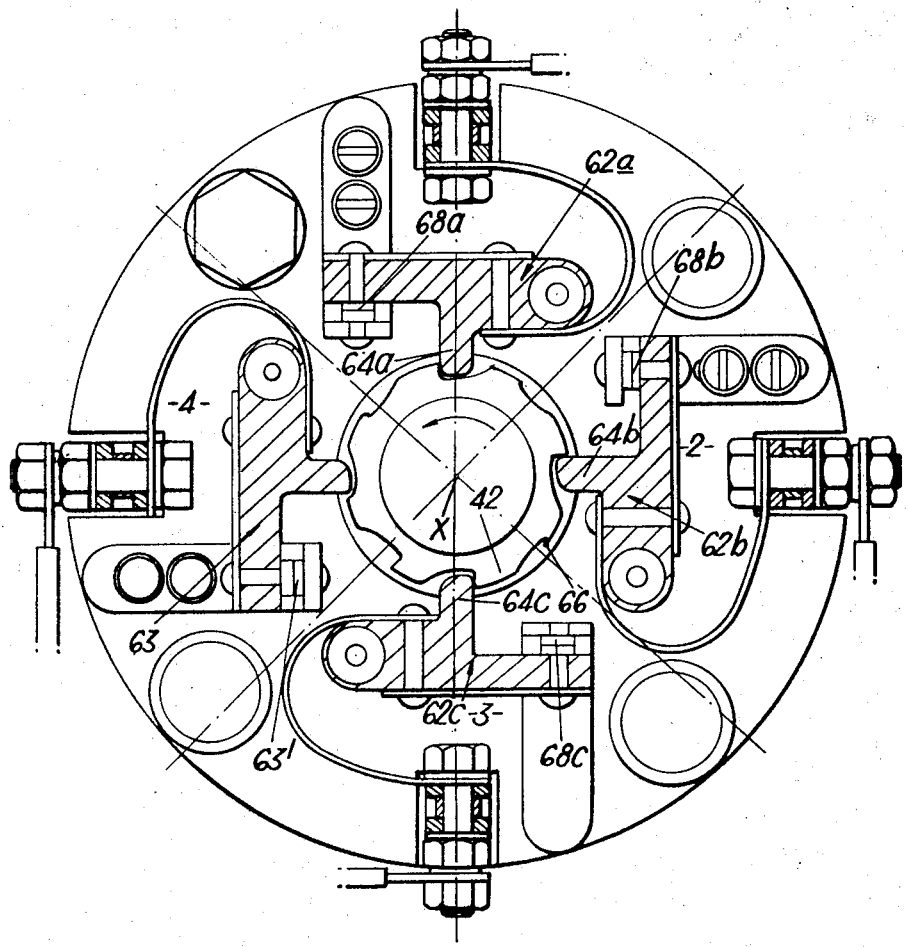
FIGURE 5 is an enlarged section on the line R—R of FIGURE 4 of the said selective drive device.
Figure 6:
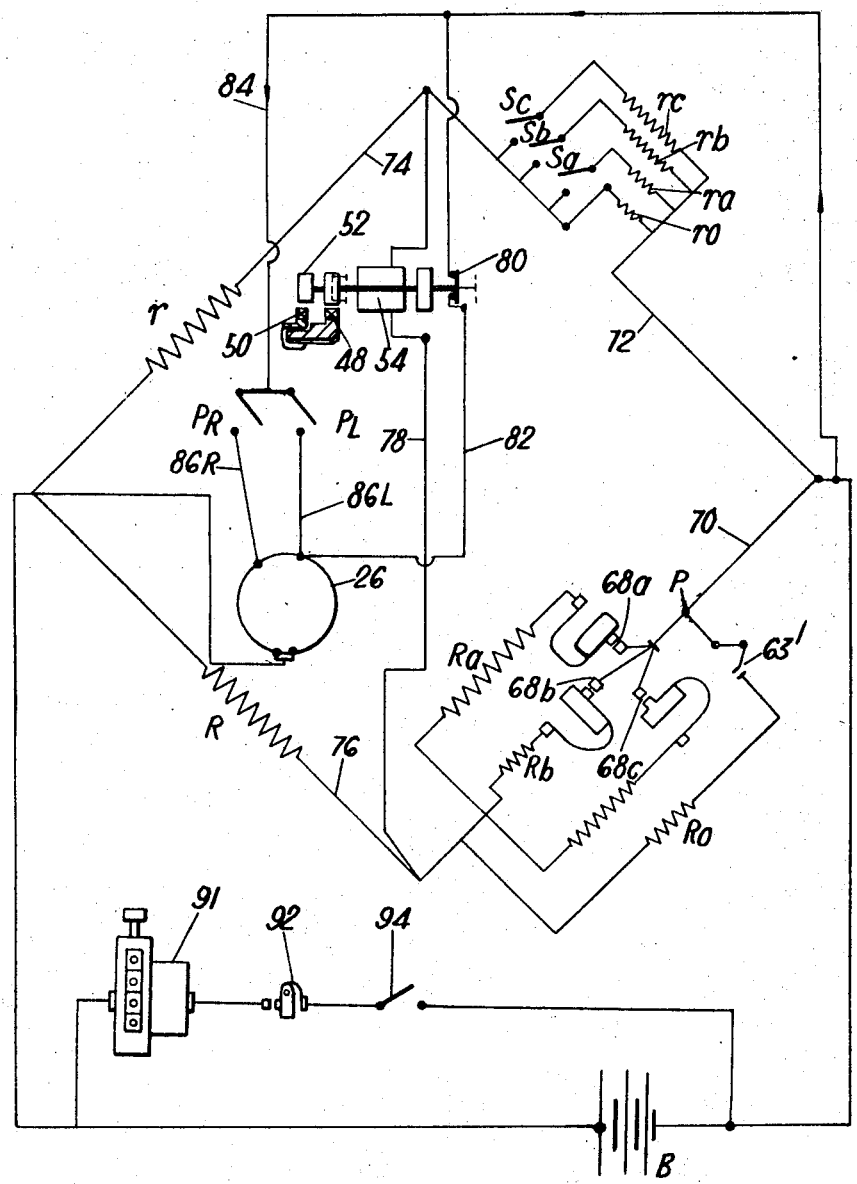
FIGURE 6 is a schematic circuit diagram of a selective drive device according to the invention.

The selective switching device, which is shown in FIGURE 5, and is illustrated in diagrammatic form in FIGURE 6, comprises three respective cam switches 62a, 62b, 62c having respective actuating elements 64a, 64b, 64c which co-operates with a common cam surface 66 provided on the planet carrier 42, the switches 62a, 62b, 62c having respective pairs of contacts 68a, 68b, 68c. The respective actuating elements 64a–64c are disposed at different radial distances from the axis of rotation X of the planet carrier 42, and the cam surface 66 is provided with corresponding camming projections of different respective radii so that, in each complete revolution of the planet carrier 42, each respective pair of contacts 68a, 68b, 68c is closed once only, when the planet carrier 42 is in a respective angular position such that the planet wheel 40 is in mesh with the respective output gear wheel 56a, 56b, 56c.

In addition, there is provided a fourth cam switch 63 having contacts 63′, the switch 63 co-operating with the cam surface 66 so that each time the planet carrier 42 is in an angular position such that the planet wheel 40 is in mesh with an output gear wheel 56 the contacts 63′ are closed.

Referring to the circuit diagram of FIGURE 6, it will be seen that one contact of each of the pairs of contacts 68a–68c of the respective cam switches 62a–62c is connected to a common circuit point P in one arm 70 of a Wheatstone bridge network. The other contact of each respective pair of contacts 68a, 68b, 68c is connected to a respective resistance Ra, Rb, Rc, the three resistances Ra–Rc being connected in parallel in the bridge arm 70. In addition, one of the contacts of the cam switch contact 63′ of cam switch 63 is connected to the said common circuit point P in bridge arm 70, the other of said switch contacts 63′ being connected to a resistance Ro which is also connected in parallel with the resistances Ra–Rc.

A reference arm 72 shares a common terminal of the bridge network with the arm 70. The reference arm 72 contains a fixed resistance $r_o$. One of three reference resistances $r_a$–$r_c$ may be connected selectively in parallel with the resistance $r_o$ by closure of a respective selector switch Sa, Sb, Sc.

The two remaining arms 74, 76 of the Wheatstone bridge contain respective fixed resistors r, R respectively. The bridge is energised from a D.C. power source B connected between the junction of arms 74, 76 and 70, 72. In conventional manner, the bridge out-of-balance current passes through a line 78 connected between the junctions of arms 72, 74 and 70, 76.

The resistors $r_a$–$r_c$ and $r_o$ and R, Ra–Rc, Ro in arms 72, 70 respectively are so chosen that the resistance $r_o$ balances the resistance Ro and the respective resistances $r_a$, $r_b$, $r_c$ balance the respective resistances Ra, Rb, Rc. One only of the selector switches Sa, Sb, Sc is closed at any time. When one of the selector switches Sa, Sb, Sc is closed, then the bridge can only be perfectly balanced when the respective cam switch contacts 68a, 68b, 68c corresponding thereto are closed, and the contacts 63′ also closed. Hence the bridge is perfectly balanced, that is, with no out-of-balance current flowing in the line 78, only when the planet carrier 42 is in an angular position such that the planet wheel 40 is in mesh wiht the respective output gear wheel 56a, 56b, 56c which has been selected by closure of the respective selector switch Sa, Sb, or Sc.

The solenoid 54 is connected in the line 78. In addition to carrying the stop member 52, the armature of solenoid 54 carries a switch contact 80 which is connected in a line 82 by means of which the electric motor 26 is connected to the power source B. It is arranged that the switch contact 80 is closed when the solenoid 54 is energised and opened when the solenoid 54 is de-energised.

A further line 84, in parallel with the line 82, also connects the motor 26 to the power source B. The line 84 includes two manual pushbutton switches $P_R$, $P_L$ through which current may be supplied to the motor 26 from the line 84 to a respective one of two supply lines $86_R$, $86_L$: when current is supplied to the motor 26 through the line $86_R$ the motor is driven in one direction of rotation, while when current is supplied through the line $86_L$, the motor is driven in the opposite direction of rotation.

Figure 2:
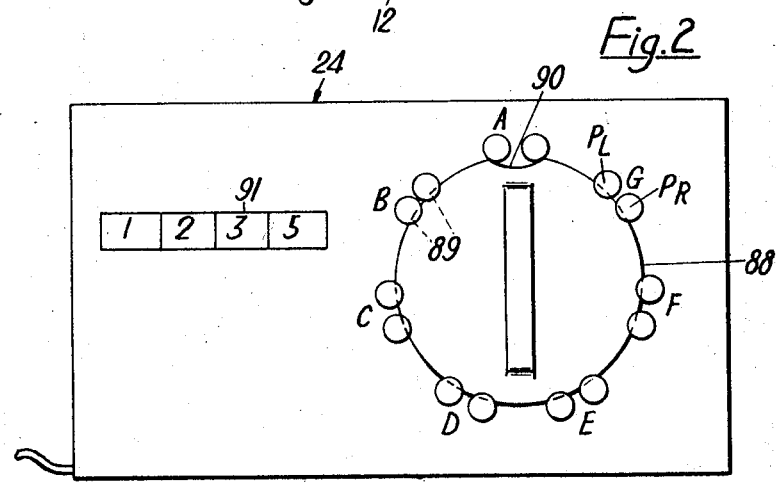
FIGURE 2 is a diagrammatic plan view of a control panel of the fuel system shown in FIGURE 1.

Although only one pair of pushbuttons $P_R$, $P_L$ is shown in the circuit of FIGURE 6, a separate pair of pushbuttons $P_R$, $P_L$ is provided for each respective secondary shaft 58 which it is desired to drive from the primary shaft 36. The pairs of pushbuttons $P_R$, $P_L$ are arranged on the control panel 24 in a circular array (FIGURE 2). The centre of the circular array coincides with the axis of rotation of circular disc-like switch selector member 88, the edge of which is received in respective detents 89 which are provided in the inwardly facing sides of each pushbutton $P_R$, $P_L$, so that the latter are prevented from being pressed by the presence of the edge of the member 88 in the detents 89 thereof. The array of pushbuttons $P_R$, $P_L$ shown in FIGURE 2 is labelled A to G and is for controlling a selective drive device having seven secondary shafts 58.

The edge of the switch selector member 88 is formed with a recessed peripheral portion 90 which is of such a depth that, when the portion 90 is disposed opposite a respective pair of pushbuttons $P_R$, $P_L$, the edge of the member 88 is clear of the detents 89 of said pushbuttons, thereby allowing the latter to be depressed.

The selector switches $Sa$, $Sb$, $Sc$ . . . are operated (by means not shown) by the selector member 88 so that, when the recessed portion 90 of the member 88 is disposed opposite a given pair of pushbuttons $P_R$, $P_L$, for example, those corresponding to selector switch $Sa$, then only the corresponding selector switch $Sa$ is closed, the remaining switches $Sb$, $Sc$ . . . being open.

The operation of the device will be described, assuming that the selector member 88 is in the position shown in FIGURE 2, in which drive is being transmitted from the primary shaft 36 to the secondary shaft 58a. Assuming it is required now to transmit drive to another selected secondary shaft, say, 58b, then the selector member 88 is rotated so that the recessed portion 90 is disposed opposite the pair of pushbuttons $P_R$, $P_L$ corresponding to the selected secondary shaft 58b, that is, position B as shown in FIGURE 2. The corresponding selector switch $Sb$ is now closed, the remaining selector switches, including $Sa$, which was originally closed, being open.

The bridge network of FIGURE 6, which was originally balanced, is now unbalanced, since resistances $Ra$ and $Ro$ are connected in arm 70, while resistances $r_b$, $r_o$ are now connected in arm 72. As a result an out-of-balance current flows in the line 78, energising the solenoid 54, as shown in full lines in FIGURE 6.

The stop member 52 is moved into engagement with the splines 50 of the ring gear member 44, preventing rotation thereof, and at the same time the switch contact 80 is closed, thereby energising the motor 26 through line 82. The drive device S is now in its "selection" mode, and rotation of the motor 26 drives the primary shaft 36 which, since ring gear member 44 is held fixed by the step member 52, causes rotation of the planet carrier 42 and therefore causes the planet carrier 40 to precess about the sun wheel 38.

As the planet carrier 42 rotates, the cam switch contacts 68a, 68b, 68c . . . are closed in turn by the cam surface 66, connecting each of the resistances $Ra$, $Rb$, $Rc$ . . . in turn in the bridge arm 70 as the planet wheel 40 is presented to each output gear wheel 56a, 56b, 56c . . . in turn. When, however, the resistance $Rb$ is connected in the bridge arm 70 by closure of the contacts 68b, then the selected resistance $r_b$ in the reference arm 72 will be balanced. When, therefore, the planet wheel 40 is in mesh with the selected output gear wheel 56b, the resulting closure of the contacts 63' by cam switch 63 will result in resistances $Rb$, $Ro$ being connected in arm 70, so that the bridge will be perfectly balanced and no further current will flow in the line 78.

The solenoid 54 is now de-energised to the setting shown in broken lines in FIGURE 6. The stop member 52 moves into engagement with the splines 48 on the planet carrier 42, preventing further rotation thereof, and at the same time the switch contact 80 opens, interrupting the current in the line 82 and stopping the motor 26.

The drive device S is now in its "transmission" mode, and closure of pushbutton $P_R$ or $P_L$ of the selected pair of pushbuttons, now released by the switch selector member 88, will cause rotation of the motor 26 in either direction as required, thereby driving the selected secondary shaft 58 through the sun wheel 38, planet wheel 40 and the respective output gear wheel 56b.

An electrically operated revolution counter 91 is connected across the power source B and displayed on the control panel 24. The counter 91 is operated by pulses from a contact breaker 92 which is operated by a cam (not shown) provided on the shaft of the motor 26, said cam being provided with ten equi-angularly spaced apart lobes so that the contact breaker 92 closes ten times in each revolution of the motor 26. The counter 91 is operated each time the contact breaker 92 closes, and consequently counts each tenth of a turn performed by the motor 26 and, therefore, by the primary shaft 36. If the gear ratio between the primary shaft 36 and the secondary shaft 58 is unity, the reading of the counter 91 will, of course, indicate directly the angular position of the selected secondary shaft 58 to which the primary shaft is connected; for other gear ratios between the primary and secondary shafts, a suitable calibration can be introduced into the readings of the counter 91. A counter operating switch 94 is connected in series with the contact breaker 92, switch 94 being mechanically interconnected with the pushbuttons $P_R$, $P_L$ so that the switch 94 is closed only when one or other of the pushbuttons $P_R$, $P_L$ is depressed. This ensures that the counter 91 counts revolutions of the motor 26 only when drive is being transmitted to a secondary shaft 58.

Figure 3:
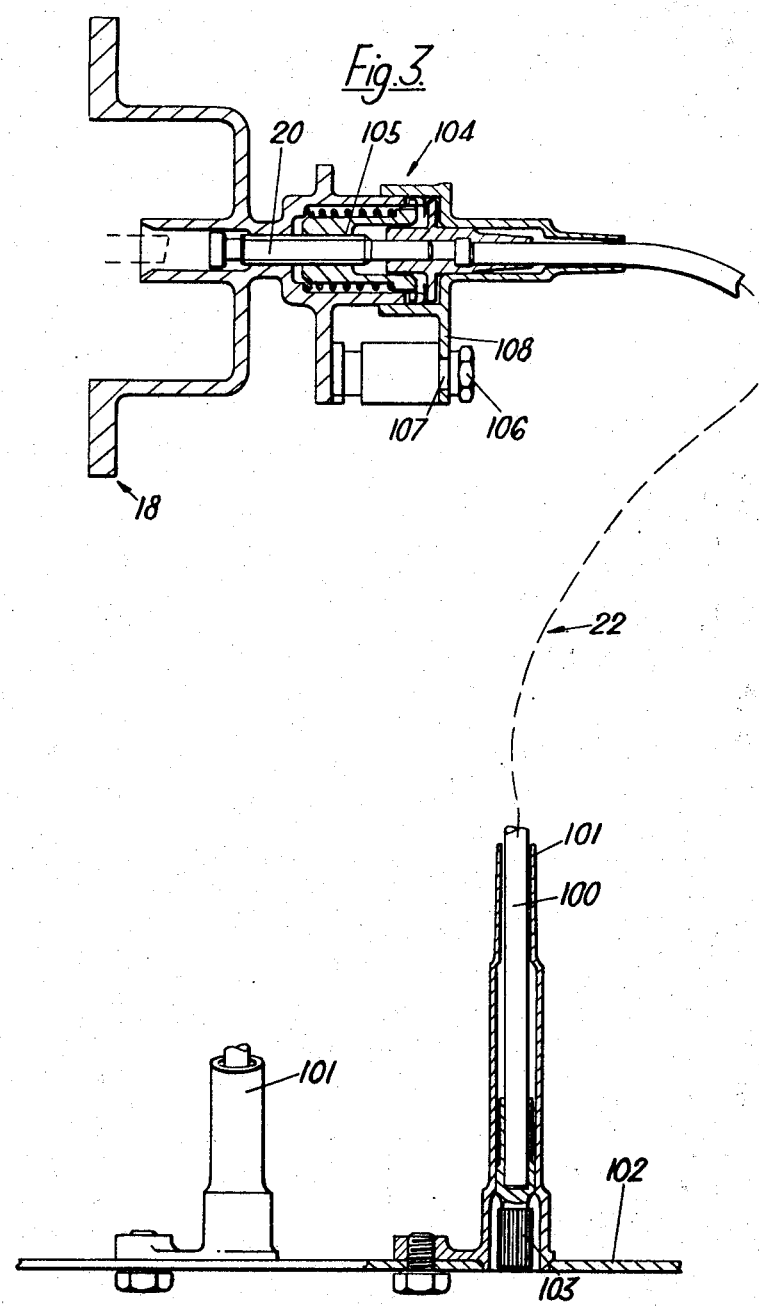
FIGURE 3 is a diagrammatic view, partly in section, of part of the fuel system of FIGURE 1.

One form of flexible drive transmission 22 for connecting each secondary shaft 58 of the drive device S to the respective adjustable member 20 of the fuel control unit 18 is shown in FIGURE 3. The transmission 22 comprises a flexible Bowden cable 100 housed in a flexible sheath 101, the end of the sheath 101 adjacent the drive device S is secured to an adaptor plate 102, the cable 100 terminating at this end in an externally splined portion 103.

The other end of the transmission 22 is connected to the adjustable member 20 of the fuel control unit 18 by a spring-loaded quick-release connection 104 which enables a splined portion 105 at that end of the cable 100 to be engaged with corresponding splines on the adjustable member 20 simply by plugging in the connection 104 and securing a retaining bolt 106 which engages in a keyhole-shaped slot 107 provided in an end fitting 108 to which the other end of the sheath 101 is secured.

All the desired flexible transmissions 22 terminate in the adaptor plate 102, which itself may be plugged into the drive device S and demountably secured thereto by bolts 110 (FIGURE 4) in such a manner that the splined portions 103 of each respective transmission 22 are all engaged simultaneously with the internal splines of each respective sleeve 60 to complete respective drive transmissions from each respective secondary shaft 58 when the plate 102 is mounted on the device S.

The control circuit of FIGURE 6 may be modified in known manner so that the revolution counter 91 will differentiate between opposite directions of rotation of the respective secondary shafts 58.

We claim:

1. Selective drive device comprising a single primary shaft, several secondary shafts arranged in a circular array about the primary shaft, a drive transmission member in drive connection with the primary shaft, transfer means operable when desired for causing the said drive transmission member to be presented on rotation of the primary shaft to each of said secondary shafts in turn, and means for rendering the transfer means inoperative automatically when said transmission member is presented to a selected secondary shaft to establish a drive connection between the primary shaft and said secondary shaft through the drive transmission member.

2. Device as claimed in claim 1 and including an electrical control circuit for controlling the transfer means, said circuit including a bridge network having one arm which has a unique resistance for each consecutive selected position of the selector means, the bridge being balanced only when the transmission member is engaged with the selected secondary shaft and the transfer means being controlled by the out-of-balance current of the bridge so that the transfer means is inoperative only when the bridge network is balanced.

3. Device as claimed in claim 2 wherein said bridge network includes a reference arm having therein selective switching means for connecting a different resistance in the reference arm for each respective secondary shaft according to which one of said shafts is selected for drive connection with the primary shaft.

4. Device as claimed in claim 3 wherein the said reference arm includes a fixed resistance component and the said one arm includes a further fixed resistance which balances said fixed resistance component and a switch device is provided for connecting said further fixed resistance in the said one arm only when the transmission member is presented to a secondary shaft, thereby ensuring that the bridge network can be balanced only when the transmission member is drivingly engaged with a secondary shaft.

5. Device as claimed in claim 2 in which a solenoid is provided for operating the transfer means.

6. Device as claimed in claim 1 in which the primary shaft is drivingly connected to a sun wheel and the selector means comprise a planet carrier having a planet wheel constituting the said transmission member rotatably mounted thereon, said planet wheel being rotatable about the sun wheel and a respective gear wheel being drivingly connected to each secondary shaft, respective said gear wheels meshing with the planet wheel when the latter is in respective said selected positions.

7. Device as claimed in claim 6 including a rotatably mounted annular member having radially inwardly facing teeth with which the said planet wheel meshes, said transfer means comprising a stop member which may be moved selectively into locking engagement with the planet carrier and with the annular member respectively to prevent rotation thereof and to render the selector means operable respectively in its transmission and selection modes.

8. Device as claimed in claim 6 and including an electrical control circuit for controlling the transfer means, said circuit including a bridge network having one arm which has a unique resistance for each consecutive selected position of the selector means, the bridge being balanced only when the transmission member is engaged with the selected secondary shaft and the transfer means being controlled by the out-of-balance current of the bridge so that the transfer means is inoperative only when the bridge network is balanced, said device further including respective cam switches operated by rotation of the planet carrier and arranged to connect different respective resistances in the said one arm when the planet wheel is meshed with the respective gear wheel of each respective secondary shaft.

9. Device as claimed in claim 1 wherein an electric motor is drivingly connected to the primary shaft and switch means are provided for connecting the motor for rotation in opposite directions selectively when the drive connection between the primary shaft and a selected secondary shaft is established.

10. Device as claimed in claim 9 including a common control panel, separate switch means provided on said control panel for each respective secondary shaft and a switch selector member mounted on said panel for releasing for operation only the switch means of a selected secondary shaft and for locking the remaining switch means.

11. Device as claimed in claim 10 wherein said switch selector member comprises a circular disc rotatable about its axis, the switch means comprising respective pushbuttons disposed at angular intervals adjacent the periphery of the disc and having respective detents in which the edge of the disc fits to prevent depression of said pushbuttons, the disc having a recessed peripheral portion which, when disposed opposite respective pushbuttons, is clear of the detents therein to permit depression of those pushbuttons only.

12. Device according to claim 1 wherein an electrically actuated counter device is connected to the primary shaft and is adapted to count the number of revolutions made thereby when the primary shaft is in drive connection with a secondary shaft.

13. A gas turbine engine fuel system including in combination a plurality of rotatably adjustable members and a selective drive device comprising a single primary shaft, several secondary shafts, arranged in a circular array about the primary shaft, a drive transmission member in drive connection with the primary shaft, transfer means operable when desired for causing the said drive transmission member to be presented on rotation of the primary shaft to each of said secondary shafts in turn, and means for rendering the transfer means inoperative automatically when said transmission member is presented to a selected secondary shaft to establish a drive connection between the primary shaft and said secondary shaft through the drive transmission member.

14. A fuel system as claimed in claim 13 wherein a responsive flexible drive transmission connects each adjustable member drivingly to the selective drive device.

15. A fuel system as claimed in claim 14 including a common adaptor member, each flexible drive transmission terminating at one end in said common adaptor member, the latter being demountably secured to the selective drive device to connect all the drive transmissions thereto simultaneously.

References Cited

UNITED STATES PATENTS

| | | | |
|---|---|---|---|
| 3,273,414 | 9/1966 | Boggs | 73—353 |
| 843,814 | 2/1907 | Hewlett | 251—133 XR |
| 1,322,979 | 11/1919 | Waite | 64—2 XR |
| 1,458,820 | 5/1923 | Stahl | 137—635 |
| 1,962,942 | 6/1934 | Seeley | 251—133 |
| 2,233,306 | 2/1941 | Champion. | |
| 3,070,974 | 1/1963 | Greenwald | 251—133 XR |

FOREIGN PATENTS 757,594  9/1956  Great Britain.

CARLTON R. CROYLE, *Primary Examiner.*

A. D. HERRMANN, *Assistant Examiner.*

U.S. Cl. X.R.

64—4; 74—665; 137—635; 318—18